United States Patent [19]

Kuribayashi

[11] 4,373,335

[45] Feb. 15, 1983

[54] SUPERCHARGE SYSTEM OF AN INTERNAL COMBUSTION ENGINE

[75] Inventor: Yasushi Kuribayashi, Yokohama, Japan

[73] Assignee: Nissan Motor Co., Ltd., Yokohama, Japan

[21] Appl. No.: 193,454

[22] Filed: Oct. 3, 1980

[30] Foreign Application Priority Data

Oct. 5, 1979 [JP] Japan .......................... 54-137420[U]

[51] Int. Cl.³ ............................................ F02B 37/12
[52] U.S. Cl. ................................................ 60/602
[58] Field of Search .................. 60/600, 601, 602, 603

[56] References Cited

U.S. PATENT DOCUMENTS

| | | | |
|---|---|---|---|
| 3,035,408 | 5/1962 | Silver | 60/602 |
| 3,270,951 | 9/1966 | Reed | 60/602 |
| 3,941,035 | 3/1976 | Mueller | 60/602 |
| 4,075,849 | 2/1978 | Richardson | 60/602 |
| 4,248,047 | 2/1981 | Sumi | 60/602 |
| 4,271,672 | 6/1981 | Withalm | 60/602 |
| 4,282,713 | 8/1981 | Antoku | 60/600 |

*Primary Examiner*—Douglas Hart
*Attorney, Agent, or Firm*—Lane, Aitken, Kice & Kananen

[57] ABSTRACT

An exhaust bypass valve actuating device is constructed and controlled such that the exhaust bypass valve opens the exhaust bypass passage so as not to apply the exhaust gas to the turbine of the turbosupercharger when the engine is in such a low load operating condition that the turbosupercharger can hardly perform supercharging and when the supercharge pressure in the intake passageway is above a predetermined value and such that the bypass valve closes the bypass passage so as to apply the exhaust gas to the turbine when the engine is in such medium and high load operating conditions that the turbosupercharger can perform supercharging.

2 Claims, 2 Drawing Figures

SUPERCHARGE SYSTEM OF AN INTERNAL COMBUSTION ENGINE

BACKGROUND OF THE INVENTION

1. Field of the Invention

The present invention relates to a supercharge system of an internal combustion engine having a throttle valve in an intake passageway and particularly to an exhaust bypass valve actuating device of a supercharge system of an engine of this type.

2. Description of the Prior Art

As is well known in the art, a conventional supercharge system (for example, disclosed in a Japanese Patent Application Publication No. 38(1963)-19660) has an exhaust bypass valve actuating device which is controlled in accordance with the pressure in the intake passageway at a location downstream of the throttle valve and the pressure in the intake passageway at a location downstream of the compressor of a turbosupercharge such that the bypass valve opens the exhaust bypass passage so as not to apply the exhaust gas to the turbine of the turbosupercharge thereby preventing a supercharge pressure (the pressure in the intake passageway at the location downstream of the compressor) from exceeding a predetermined value.

However, the bypass valve actuating device has been constructed and controlled such that the bypass valve does not open the bypass passage to apply the exhaust gas to the turbine when the engine is in low load operating condition.

When the exhaust gas is applied to the turbine of a turbosupercharger during any operation of an engine, the back pressure of the engine increases to reduce the power output of the engine. Moreover, when the back pressure increases during a low load operation of the engine, the fuel consumption and the driveability of the engine especially deteriorate. This is for the following reason: When the engine is in such a low load operating condition that the engine produces a small quantity of exhaust gas, the turbine can not produce sufficient power for driving the compressor of the turbosupercharger. Accordingly, the turbosupercharger can hardly perform supercharging to increase the power output of the engine. As a result, a minus effect by an increase in the back pressure is far larger than a plus effect by supercharging to deteriorate the fuel consumption and the driveability of the engine.

Accordingly, when the accelerator pedal is depressed during a low load operation of an engine having the conventional supercharge system, the engine can not produce a sufficient power output. Thus, the conventional supercharge system has suffered from a drawback that the fuel consumption and the driveability of the engine such as the accelerating ability deteriorate.

SUMMARY OF THE INVENTION

It is, therefore, an object of the invention to provide a supercharge system improved such that the exhaust bypass valve opens the exhaust bypass passage so as not to apply the exhaust gas to the turbine when the engine is in such a low load operating condition that the turbosupercharger can hardly perform supercharging and when the supercharge pressure in the intake passageway of the engine is above a predetermined value, and such that the bypass valve closes the bypass passage so as to apply the exhaust gas to the turbine when the engine is in such medium and high load operating conditions that the turbosupercharger can perform supercharging.

According to the invention, a supercharge system comprises an exhaust bypass valve actuating device having a first pressure chamber, a second pressure chamber, a flexible diaphragm connected to the bypass valve and separating the first and second pressure chambers from each other, the diaphragm being movable into such a first position that the bypass valve opens the bypass passage and into such a second position that the bypass valve closes the bypass passage, and a return spring for biasing the diaphragm in such a direction that the bypass valve closes the bypass passage. A first passage provides communication between the first pressure chamber and a first portion of the intake passageway which is located downstream of the throttle valve. A second passage provides communication between the second pressure chamber and a second portion of the intake passageway which is located downstream of the compressor. A pressure difference adjusting valve is provided for adjusting the difference between the pressures in the first and second pressure chambers such that the diaphragm is moved in response to the difference between the pressures in the first and second pressure chambers into the first position when the pressure in the first portion is below a first predetermined value and when the pressure in the second portion is above a second predetermined value higher than the first predetermined value and into the second position when the pressure in the first portion is above the first predetermined value and the pressure in the second portion is below the second predetermined value. The adjusting valve is provided in one of the first and second passages.

In one embodiment of the invention, the compressor is disposed downstream of the throttle valve and the first portion is located between the throttle valve and the compressor. The pressure difference adjusting valve comprises a valve member for selectively opening and closing the second passage, and a valve member actuating device comprising a third chamber communicating with the second portion, a fourth chamber communicating with the atmosphere, and another flexible diaphragm connected with the valve member and separating the third and fourth chambers from each other. The another diaphragm is movable into such a third position that the valve member closes the second passage and into such a fourth position that the valve member opens the second passage. A return spring is included for biasing the another diaphragm such that the another diaphragm is moved in response to the difference between the pressures in the third and fourth chambers into the third position to stop the feed of the pressure in the second portion to the second pressure chamber when the pressure in the second portion is below the second predetermined value and into the fourth position to effect the feed of the pressure in the second portion to the second pressure chamber when the pressure in the second portion is above the second predetermined value.

In another embodiment of the invention, the compressor is disposed upstream of the throttle valve and the second portion is located between the compressor and the throttle valve. The pressure difference adjusting valve comprises a housing disposed midway in the first passage to divide the first passage into first and second sections, a partition dividing the interior of the housing into a third chamber communicating with the first portion through the first section, and a fourth chamber communicating with the first pressure chamber through the second section and with the atmosphere through an orifice. A check valve is disposed at the partition and constructed and arranged so as to be opened to effect communication between the third chamber and the fourth chamber and to feed a vacuum diluted by the atmosphere entering through the orifice to the first pressure chamber when the pressure in the first portion is a vacuum. The check valve is closed to block communication between the third and fourth chambers to maintain the pressure in the first pressure chamber at the atmospheric pressure when the pressure in the first portion is above the atmospheric pressure such that the diaphragm is moved in response to the difference between the pressures in the first and second pressure chambers into the first position when the pressure in the first portion is below the first predetermined value and when the pressure in the second portion is above the second predetermined value and into the second position when the pressure in the first portion is above the first predetermined value and the pressure in the second portion is below the second predetermined value.

A supercharge system according to the invention has an advantage that the bypass valve closes the bypass passage so as to perform supercharging to increase the power output of the engine when the engine is in medium and high load or medium and high speed operating conditions and the bypass valve opens the bypass passage so as to prevent the back pressure of the engine increasing to prevent the fuel consumption and the driveability of the engine from deteriorating when the engine is in a low load or low speed operating condition and so as to prevent excessive supercharging when the supercharge pressure in the intake passageway is above a predetermined value without injuring the effect by supercharging in the medium and high load operations of the engine.

A supercharge system according to the invention has an additional advantage that the exhaust bypass valve actuating device is compact and the cost of production is largely reduced by using two simple diaphragm devices each having one diaphragm without using a complicated diaphragm device having two diaphragms as in the bypass valve actuating device of the conventional supercharge system.

DESCRIPTION OF THE PREFERRED EMBODIMENTS

Figure 1:
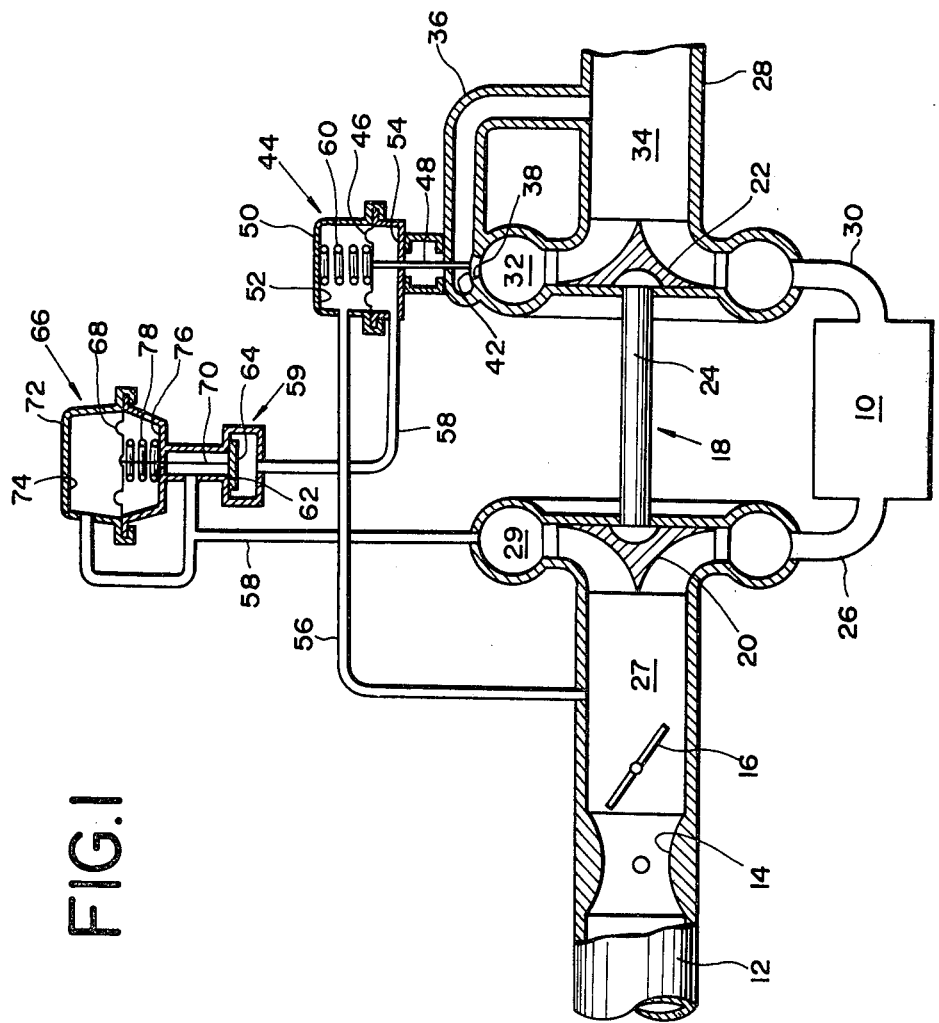
FIG. 1 is a schematic and sectional view of a first preferred embodiment of a supercharge system according to the present invention.

In the first embodiment shown in FIG. 1, the present invention is applied to an internal combustion engine of a type having a carburetor.

As shown in FIG. 1, an engine 10 includes an intake passageway 12 having therein a venturi 14 of a carburetor and a throttle valve 16 disposed downstream of the venturi 14, and an exhaust passageway 28. The throttle valve 16 is connected to and thus controlled by an accelerator pedal (not shown). A supercharge system comprises a turbosupercharger 18 including a turbine rotor 22 disposed in the exhaust passageway 28 at a portion downstream of an exhaust manifold 30 so as to be driven by exhaust gas of the engine 10, and a compressor impeller 20 disposed in the intake passageway 12 at a portion downstream of the throttle valve 16 and upstream of an intake manifold 26. The compressor impeller 20 is connected with the turbine 22 through a shaft 24 so as to be driven by the turbine 22 to force air into the engine 10 at a pressure higher than the atmospheric pressure.

An exhaust bypass pressure 36 connects a portion 32 of the exhaust passageway 28 which is located upstream of the turbine 22 with a portion 34 of the exhaust passageway 28 which is located downstream of the turbine 22 so as to bypass the turbine 22. A valve seat 38 is provided in the bypass passage 36. An exhaust bypass valve 42 is movably disposed so as to selectively contact and leave the valve seat 38 to close and open the bypass passage 36. A valve actuating device 44 is arranged outside the exhaust passageway 28 and has a flexible diaphragm 46 fixedly connected to the bypass valve 42 through a rod 48, and a housing 50 the interior of which is divided into a first pressure chamber 52 and a second pressure chamber 54 by the diaphragm 46. The first pressure chamber 52 communicates with a first portion 27 of the intake passageway 12 which is located between the throttle valve 16 and the compressor 20 through a first passage 56 to receive the pressure in the portion first 27. The second pressure chamber 54 communicates with a second portion 29 of the intake passageway 12 which is located downstream of the compressor 20 through a second passage 58 to receive the pressure in the portion second 29. A spring 60 is disposed in the first pressure chamber 52 and biases the diaphragm 46 downward in the drawing; that is, in such a direction that the bypass valve 42 closes the bypass passage 36. A pressure difference adjusting valve 59 comprises a valve seat 62 disposed midway in the second passage 58, and a valve member 64 is movably disposed so as to selectively contact and leave the valve seat 62 to close and open the second passage 58. A valve member actuating device 66 has a flexible diaphragm 68 fixedly connected with the valve member 64 through a rod 70, and a housing 72 the interior of which is divided into a pressure chamber 74 and an atmosphere chamber 76 by the diaphgram 68. The pressure chamber 74 communicates with the second portion 29 of the intake passageway 12 through a part of the second passage 58 to receive the pressure in the second portion 29. The atmosphere chamber 76 communicates with the atmosphere. A spring 78 is disposed in the atmosphere chamber 76 and biases the diaphragm 68 upward in the drawing, that is, in such a direction that the valve member 64 closes the second passage 58.

The supercharge system thus constructed operates as follows:

When the pressure in the first portion 27 of the intake passageway 12 is below a first predetermined value (for example, −300 mmHg), that is, when the engine 10 is in such a low load operating condition that the turbosupercharger 18 can hardly perform supercharging, the diaphragm 68 of the actuating device 66 is moved into such a position that the valve member 64 closes the second passage 58 by a resultant force of the action of the spring 78 and the difference between the pressure in the atmosphere chamber 76 and the pressure in the pressure chamber 74. In the actuating device 44, since the difference between the pressure in the second pressure chamber 54 and the pressure in the first pressure chamber 52 is above the force of the spring 60, the diaphragm 46 is moved upward by the pressure difference against the force of the spring 60 into such a position that the bypass valve 42 opens the bypass passage 36. As a result, exhaust gas flowing from the engine 10 into the portion 32 of the exhaust passageway 28 flows into the portion 34 of the exhaust passageway 28 through the bypass passage 36 to bypass the turbine 22, thus to prevent an increase in the back pressure of the engine 10. Since no loss of the power output of the engine 10 occurs owing to no increase in the back pressure, the fuel consumption and the driveability of the engine 10 are prevented from deteriorating.

When the pressure in the first portion 27 of the intake passageway 12 becomes higher than the first predetermined value with an increase in the load of the engine 10 to a medium load, the valve member 64 is maintained in a position closing the second passage 58. The diaphragm 46 of the actuating device 44 is moved downward by a resultant force of the difference between the pressures in the first and second pressure chambers 52 and 54 and the force of the spring 60 into such a position that the bypass valve 42 closes the bypass passage 36. As a result, exhaust gas flowing from the engine 10 into the portion 32 wholly flows into the turbine 22 to drive the same. Accordingly, the turbosupercharger 18 can perform supercharging. This state continues until the pressure in the second portion 29 of the intake passageway 12 increases with further increase in the load of the engine 10 and reaches a second predetermined value (for example, 300 mmHg) higher than the first predetermined value.

When the pressure in the second portion 29 of the intake passageway 12 reaches the second predetermined value during a high load operation of the engine 10, the diaphgram 68 of the actuating device 66 is moved downward by the difference between the pressures in the pressure and atmosphere chambers 74 and 76, respectively, against the force of the spring 78 in such a position that the valve member 64 opens the second passage 58. Accordingly, the pressure (supercharge pressure) in the second portion 29 is fed into the second pressure chamber 54 of the actuating device 44 through the second passage 58. On the other hand, the first pressure chamber 52 of the actuating device 44 is fed with a vacuum in the first portion 27 of the intake passageway 12 through the first passage 56. As a result, the diaphragm 46 is positively moved upward by the difference between the pressures in the first and second pressure chambers 52 and 54 against the action of the spring 60 such that the bypass valve 42 positively opens the bypass passage 36. Accordingly, since exhaust gas flowing from the engine 10 into the portion 32 flows into the portion 34 through the bypass passage 36, the turbosupercharger 18 performs no supercharging to subject the intake manifold 26 to a supercharge pressure above the second predetermined value thereby preventing the engine 10 being damaged by an excessive supercharging.

Figure 2:
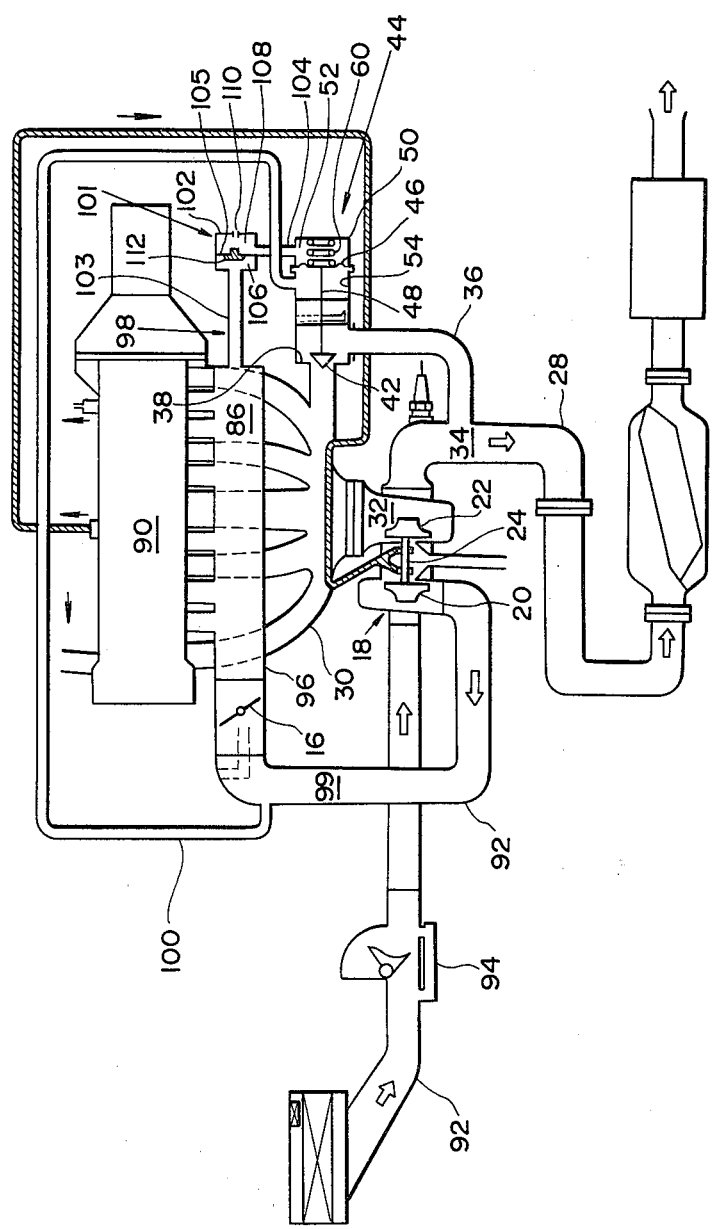
FIG. 2 is a schematic and sectional view of a second preferred embodiment of a supercharge system according to the present invention.

In the second embodiment shown in FIG. 2, the present invention is applied to an internal combustion engine of an electronically controlled fuel injection type. In FIG. 2, like component elements and parts are designated by the same reference numerals as those used in FIG. 1.

A supercharge system of FIG. 2 differs from that of FIG. 1 in the following respects. An engine 90 has an intake passageway 92 having therein an air flow meter 94. A throttle valve 16 is disposed downstream of the air flow meter 94. A compressor 20 of a turbosupercharger 18 is disposed in a portion of the intake passageway 92 which is located between the air flow meter 94 and the throttle valve 16. A first pressure chamber 52 of a valve actuating device 44 communicates with a first portion 86 of the intake passageway 92 which is located downstream of the throttle valve 16 (an intake manifold 96 in this embodiment) through a first passage 98 and a pressure difference adjusting valve 101. A second pressure chamber 54 of the actuating device 44 communicates with a second portion 99 of the intake passageway 92 which is located between the compressor 20 and the throttle valve 16 through a second passage 100 to receive the pressure in the second portion 99. The pressure difference adjusting valve 101 comprises a valve housing 102 disposed midway in the first passage 98 to divide the passage 98 into first and second sections 103 and 104. A partition 105 divides the interior of the housing 102 into a third chamber 106 communicating with the first portion 86 through the first section 103, and a fourth chamber 108 communicating with the first pressure chamber 52 through the second section 104. The fourth chamber 108 also communicates with the atmosphere through an orifice 110. A check valve 112 is disposed at the partition 104 and is constructed and arranged so as to allow fluid flow from the fourth chamber 108 to the third chamber 106 but not to allow fluid flow from the third chamber 106 to the fourth chamber 108.

The supercharge system thus constructed operates as follows:

When the pressure in the first portion 86 of the intake passageway 92 is below the first predetermined value (e.g. 300 mmHg), the first pressure chamber 52 of the actuating device 44 is fed with a vacuum from the first portion 86 through the first passage 98 and the check valve 112. The vacuum is diluted by the atmosphere entering the fourth chamber 108 of the housing 102 through the orifice 110. In this instance, that is, during a low load operation of the engine 90, since the turbosupercharger 18 substantially performs no supercharging, the second pressure chamber 54 is fed with a vacuum akin to the atmospheric pressure from the second portion 99 through the second passage 100. As a result, a diaphragm 46 of the actuating device 44 is moved toward the right as shown in the drawing by the difference between the pressures in the first and second pressure chambers 52 and 54 against the action of a spring 60 into such a position that a bypass valve 42 opens a bypass passage 36. Accordingly, exhaust gas flowing from the engine 90 into an exhaust manifold 30 flows into a portion 34 of an exhaust passageway 28 through a bypass passage 36 so as to bypass a turbine 22 to prevent increase in the back pressure of the engine 90. Accordingly, the fuel consumption and the driveability of the engine 90 is prevented from being deteriorated.

While the pressure in the first portion 86 of the intake passageway 92 is higher than the aforementioned first predetermined value and the pressure in the second portion 99 of the intake passageway 92 remains between the first predetermined value and a higher second predetermined value (e.g. 300 mmHg), the vacuum diluted by the atmosphere through the orifice 110 and transmitted to the first pressure chamber 52 of the actuating device 44 becomes weaker than the vacuum during the above described low load operation of the engine. If the pressure in the first portion 86 becomes a positive pressure, the check valve 112 closes to maintain the first pressure chamber 52 of the device 44 at the atmospheric pressure admitted through the orifice 110. Accordingly, whether the pressure in the first portion 86 is negative or positive, the diaphragm 46 is moved left by a resultant force of the action of the spring 60 and the difference between the pressures in the first and second pressure chambers 52 and 54 into such a position that the bypass valve 42 closes the bypass passage 36. Accordingly, the turbosupercharger 18 performs supercharging.

When the pressure in the second portion 99 of the intake passageway 92 is above the second predetermined value, the diaphragm 46 is moved to the right by a resultant force of the difference between the pressures in the first and second pressure chambers 52 and 54 and the force of the spring 60 such that the bypass valve 42 opens the bypass passage 36. Accordingly, since the turbosupercharger 18 ceases to perform supercharging, the pressure in the first portion 86 of the intake passage 92 is prevented from exceeding the second predetermined value.

What is claimed is:

1. A supercharge system of an internal combustion engine including an intake passageway having a throttle valve therein, and an exhaust passageway, the supercharge system comprising:
    a turbosupercharger having a turbine disposed in the exhaust passageway so as to be driven by exhaust gas of the engine, and a compressor disposed in the intake passageway downstream of the throttle valve and connected with said turbine so as to be driven by said turbine to force air into the engine at a pressure higher than the atmospheric pressure;
    an exhaust bypass passage which branches from the exhaust passageway at a portion upstream of said turbine and joins the exhaust passageway at a portion downstream of said turbine so as to bypass said turbine;
    an exhaust bypass valve for selectively opening and closing said bypass passage;
    a bypass valve actuating device having a first pressure chamber, a second pressure chamber, a flexible diaphragm connected to said bypass valve and separating said first and second pressure chambers from each other, said diaphragm being movable into such a first position that said bypass valve opens said bypass passage and into such a second position that said bypass valve closes said bypass passage, and a return spring for biasing said diaphragm in such a direction that said bypass valve closes said bypass passage;
    a first passage for providng communication between said first pressure chamber and a first portion of the intake passageway which is located downstream of the throttle valve between the throttle valve and said compressor;
    a second passage for providing communication between said second pressure chamber and a second portion of the intake passageway which is located downstream of said compressor; and
    a pressure difference adjusting valve for adjusting the difference between the pressures in said first and second pressure chambers such that said bypass valve is opened when the pressure in said first portion of the intake passageway is below a first predetermined value and when the pressure in said second portion of the intake passageway is above a second predetermined value which is higher than said first predetermined value, and that said bypass valve is closed when the pressure in said first portion is above said first predetermined value and the pressure in said second portion is below said second predetermined value,
    said pressure difference adjusting valve comprising:
    a valve member for selectively opening and closing said second passage, and
    a valve member actuating device comprising:
    a third chamber communicating with said second portion,
    a fourth chamber communicating with the atmosphere,
    another flexible diaphragm connected with said valve member and separating said third and fourth chambers from each other, said another diaphragm being movable into such a third position that said valve member closes said second passage and into such a fourth position that said valve member opens said second passage, and
    a return spring for biasing said another diaphragm such that said another diaphragm is moved in response to the difference between the pressures in said third and fourth chambers into said third position to stop the feed of the pressure in said second portion to said second pressure chamber when the pressure in said second portion is below said second predetermined value and into said fourth position to effect the feed of the pressure in said second portion to said second pressure chamber when the pressure in said second portion is above said second predetermined value.

2. A supercharge system of an internal combustion engine including an intake passageway having a throttle valve therein, and an exhaust passageway, the supercharge system comprising:
    a turbosupercharger having a turbine disposed in the exhaust passageway so as to be driven by exhaust gas of the engine, and a compressor disposed in the intake passageway upstream of the throttle valve and connected with said turbine so as to be driven by said turbine to force air into the engine at a pressure higher than the atmospheric pressure;
    an exhaust bypass passage which branches from the exhaust passageway at a portion upstream of said turbine and joins the exhaust passageway at a portion downstream of said turbine so as to bypass said turbine;
    an exhaust bypass valve for selectively opening and closing said bypass passage;
    a bypass valve actuating device having a first pressure chamber, a second pressure chamber, a flexible diaphragm connected to said bypass valve and separating said first and second pressure chambers from each other, said diaphragm being movable into such a first position that said bypass valve opens said bypass passage and into such a second position that said bypass valve closes said bypass passage, and a return spring for biasing said diaphragm in such a direction that said bypass valve closes said bypass passage;
    a first passage for providing communication between said first pressure chamber and a first portion of the intake passageway which is located downstream of the throttle valve;

a second passage for providing communication between said second pressure chamber and a second portion of the intake passageway which is located downstream of said compressor between said compressor and the throttle valve; and a pressure difference adjusting valve for adjusting the difference between the pressures in said first and second pressure chambers such that said bypass valve is opened when the pressure in said first portion of the intake passageway is below a first predetermined value and when the pressure in said second portion of the intake passageway is above a second predetermined value, and that said bypass valve is closed when the pressure in said first portion is above said predetermined value and the pressure in said second portion is below said predetermined value, said pressure difference adjusting valve comprising:

a housing disposed midway in said first passage to divide said first passage into first and second sections, a partition dividing the interior of said housing into a third chamber communicating with said first portion through said first section, and a fourth chamber communicating with said first pressure chamber through said second section and with the atmosphere through an orifice, and a check valve disposed at said partition and constructed and arranged so as to be opened to effect communication between said third chamber and said fourth chamber and to feed a vacuum diluted by the atmosphere entering through said orifice to said first pressure chamber when the pressure in said first portion is a vacuum and so as to be closed to block communication between said third and fourth chamber to maintain the pressure in said first pressure chamber at the atmospheric pressure when the pressure in said first portion is above the atmospheric pressure such that said diaphragm is moved in response to the difference between the pressures in said first and second pressure chambers into said first position when the pressure in said first portion is below said predetermined value and when the pressure in said second portion is above said second predetermined value and into said second position when the pressure in said first portion is above said first predetermined value and the pressure in said second portion is below said second predetermined value.

* * * * *